United States Patent
Sato et al.

[11] Patent Number: 6,034,749
[45] Date of Patent: Mar. 7, 2000

[54] LIGHT INSENSITIVE TYPE ACTIVE MATRIX WITH P AND N REGIONS CONNECTED TO A REFERENCE POTENTIAL

[75] Inventors: Hideo Sato; Minoru Hoshino, both of Hitachi; Yuji Mori, Ibaraki-ken, all of Japan; Shinichi Komura, Sheffield, United Kingdom; Yoshiharu Nagae; Ichirou Katsuyama, both of Hitachi, Japan; Tetsuya Nagata, Katsuta, Japan; Akira Arimoto, Kodaira, Japan; Akio Hayasaka, Higashiyamato, Japan

[73] Assignees: Hitachi, Ltd., Tokyo; Hitachi Process Computer Engineering, Hitachi, both of Japan

[21] Appl. No.: 08/485,157

[22] Filed: Jun. 7, 1995

Related U.S. Application Data

[62] Division of application No. 08/132,412, Oct. 6, 1993, Pat. No. 5,461,501.

[30] Foreign Application Priority Data

Oct. 8, 1992 [JP] Japan ..... 4-269961

[51] Int. Cl.[7] ..... G02F 1/136
[52] U.S. Cl. ..... 349/47; 349/110; 349/44
[58] Field of Search ..... 349/5, 8, 9, 47, 349/48, 38, 39, 110, 44; 257/59, 72, 258, 291, 294

[56] References Cited

U.S. PATENT DOCUMENTS

| | | | |
|---|---|---|---|
| 3,862,360 | 1/1975 | Dill et al. | 178/7.3 |
| 4,103,297 | 7/1978 | McGreivy et al. | 349/47 |
| 4,239,346 | 12/1980 | Lloyd | 359/59 |
| 4,382,658 | 5/1983 | Shields et al. | 359/70 |
| 4,431,271 | 2/1984 | Okubo | 359/58 |
| 5,159,476 | 10/1992 | Hayashi | 359/54 |
| 5,276,365 | 1/1994 | Maekawa et al. | 326/63 |
| 5,283,565 | 2/1994 | Suzuki et al. | 345/98 |
| 5,365,355 | 11/1994 | Hastings, III | 359/59 |
| 5,371,617 | 12/1994 | Mitsutake et al. | 349/5 |

OTHER PUBLICATIONS

Technical Reports of the Electronic Communication Society, IE 80-81, 1980.

*Primary Examiner*—Kenneth Parker
*Attorney, Agent, or Firm*—Kenyon & Kenyon

[57] ABSTRACT

A liquid crystal light valve includes a semiconductor substrate having a region for a plurality of switching elements formed in a matrix form. A first metal layer is formed on the surface of the semiconductor substrate through an insulating layer and divided into a plurality of parts by first slits. A second metal layer is formed on the first metal layer through another insulating layer and divided into a plurality of parts by second slits. A third metal layer is formed on the second metal layer through still another insulating layer and divided into a plurality of parts by third slits. An opposite substrate has an opposite electrode on a surface thereof, disposed so as to be opposite to said third metal layer through an interval on the opposite electrode side. Liquid crystal fills the interval between said opposite electrode and the third metal layer.

13 Claims, 12 Drawing Sheets

F I G. I

F I G. 3
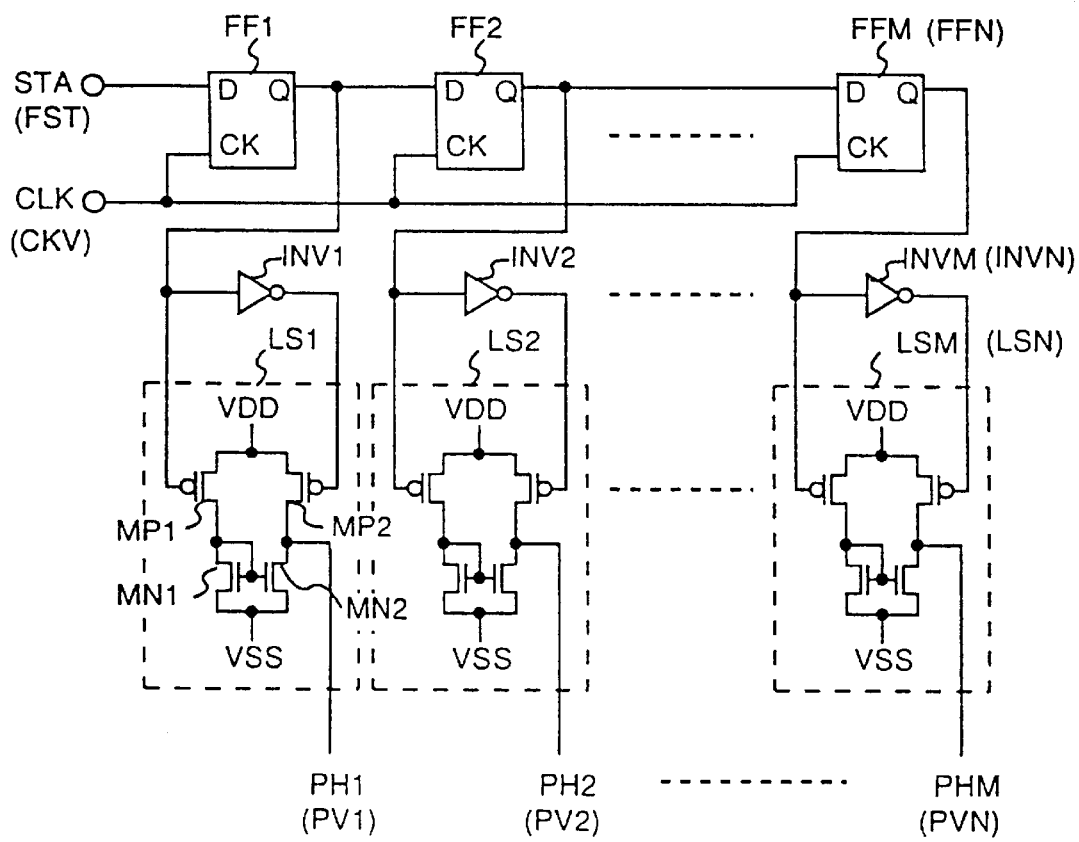

☐ DIFFUSION LAYER
▨ POLYCRYSTALLINE SILICON LAYER

F I G. 13
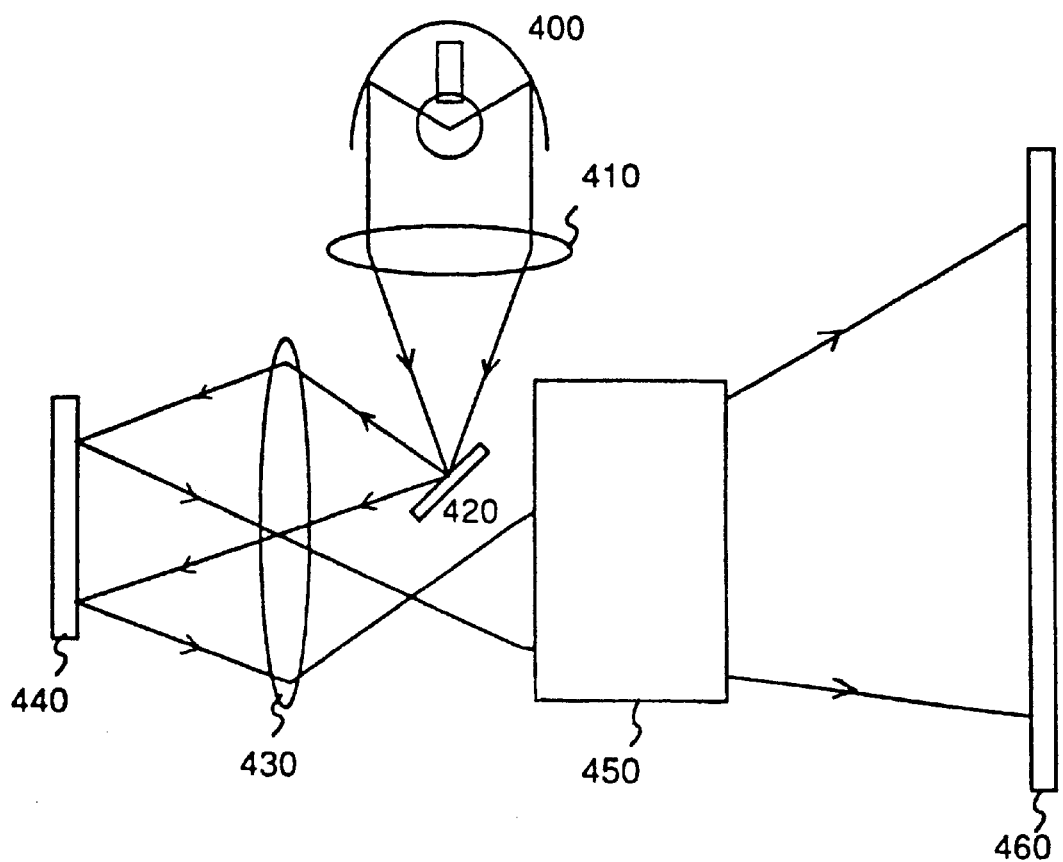

LIGHT INSENSITIVE TYPE ACTIVE MATRIX WITH P AND N REGIONS CONNECTED TO A REFERENCE POTENTIAL

This is a division of application Ser. No. 08/132,412 filed on Oct. 6, 1993 now U.S. Pat. No. 5,461,501.

BACKGROUND OF THE INVENTION

The present invention relates to a liquid crystal display, in which light intensity is controlled by amplitude of voltage applied thereto, and in particular to a liquid crystal light valve suitable for a projection type display and a projection type display using same.

Liquid crystal displays of active matrix system using MOS (Metal Oxide Semiconductor) transistors. formed on a monocrystal silicon substrate for switching elements are described in U.S. Pat. No. 3,862,360 and Technical Reports of the Electronic Communication Society, IE 80-81, 1980, in which the switching elements and a liquid crystal layer are superposed on each other and light intensity is controlled by means of the former.

All these displays are of a system, in which images obtained by controlling the switching elements are viewed directly, and they are used usually in a room. For this reason, a resistance to light intensity of several tens of thousand lx necessary for a display panel was sufficient.

When an MOS transistor is irradiated with light, photocurrent is produced in PN junction portions forming a source and a drain in the MOS transistor. This current changes voltage applied to the liquid crystal, which remarkably worsens image quality.

In order to reduce this photo-current, according to the Technical Reports of the Electronic Communication Society described previously, various countermeasures were taken that the source region in the MOS transistor was located as far as possible from a region where light was injected, that the surface of the silicon substrate on which MOS transistors were formed was covered by two wiring layers, that a stopper diffusion layer was disposed to recombine generated carriers, etc.

In addition, since display size in the displays described above was as small as about 5 cm because of restriction imposed by silicon wafers, etc., the number of pixels in such a display was about 40,000 due to this display size and resolving power capable of producing recognizable images.

As described above, liquid crystal displays using MOS transistors formed on a monocrystal silicon substrate were restricted to be of direct view type.

On the other hand, in a projection type display, a panel constructed by superposing switching elements and a liquid crystal layer on each other is called a liquid crystal light valve and images controlled by this light valve are projected on a screen in an enlarged scale. For this reason intensity of light projected to the light valve should be increased, corresponding to the enlargement on the screen, and brightness thereof attains several million 1x. Furthermore since the pixels controlled by the light valve are enlarged and the images thus obtained are roughened, pixels more than 30,000 are required for the light valve.

As described above, for a projection type display, such as where a liquid crystal light valve using transistors formed on a semiconductor substrate such as silicon substrate, it is required to increase resistance to light intensity of the liquid crystal light valve and to write image signals with a high speed in pixels due to increase in the number of pixels.

SUMMARY OF THE INVENTION

The present invention has been made in view of such a situation and objects thereof are to provide a liquid crystal light valve using a semiconductor substrate such as a silicon substrate, etc., which is not influenced by strong irradiation light and excellent in the resistance to light, to provide a liquid crystal light valve, in which image signals can be written with a high speed, and further to provide a projection type display, which can display very fine and bright images of high quality by using such a liquid crystal light valve.

In order to achieve the above objects, a liquid crystal light valve according to the present invention is constructed as described below.

It comprises a semiconductor substrate having a region for a plurality of switching elements formed in a matrix form on a surface thereof; a first metal layer formed on the surface of the semiconductor substrate through an insulating layer and divided into a plurality of parts by first slits; a second metal layer formed on the first metal layer through another insulating layer and divided into a plurality of parts by second slits; a third metal layer formed on the second metal layer through still another insulating layer and divided into a plurality of parts by third slits; an opposite substrate having an opposite electrode on a surface thereof, disposed so as to be opposite to the third metal layer through an interval on the opposite electrode side; and liquid crystal filling the interval between the opposite electrode and the third metal layer, wherein the first slits, the second slits and the third slits are located so as to be displaced from each other in a direction parallel to the surface of the semiconductor substrate so that it is prevented for light projected from the opposite substrate side thereto to reach the semiconductor substrate.

Further it comprises a semiconductor substrate having a region for a plurality of switching elements formed in a matrix form on a surface thereof; a first metal layer formed on the surface of the semiconductor substrate through an insulating layer and divided into a plurality of parts by first slits; a second metal layer formed on the first metal layer through another insulating layer and divided into a plurality of parts by second slits; an opposite substrate having an opposite electrode on a surface thereof, disposed so as to be opposite to the second metal layer through an interval on the opposite electrode side; and liquid crystal filling the interval between the opposite electrode and the second metal layer, wherein semiconductor regions connected with a reference potential are disposed at places where light injected from the opposite substrate side through the first slits and the second slits reaches the semiconductor substrate.

Still further a capacitive element region is disposed, corresponding to each of the switching element regions, on the surface of the semiconductor substrate and substrate feeding lines feeding substrate potential regions and capacitive element regions in the switching element regions described above with a substrate potential are constructed by either one of the metal layers described previously.

Still further image signal lines feeding image signal input terminal portions in the switching element regions with image signals are constructed by either one f the metal layers described previously and the substrate feeding lines and the image signal lines are disposed parallel to each other.

Since the metal layers reflect injected light, they weaken light projected to the surface of the semiconductor substrate and thus it is possible to reduce significantly photo-current flowing through the switching element regions.

Photo-current generated by irradiating semiconductor regions connected with the reference potential with light is consumed by flowing to wiring portions on the reference potential side and thus has no influences on the switching element regions.

Impedance of the substrate feeding lines and the image signal lines can be reduced and speed, with which image signals are written in the different pixels, can be increased, owing to the fact that these lines are constituted by the metal layers and disposed parallelly to each other.

Since the switching elements in the liquid crystal light valve are not influenced by irradiation light and it is possible to increase the number of pixels by increasing the speed, with which image signals are written, it is possible to provide a projection type display capable of displaying very fine and bright images of high quality.

BRIEF DESCRIPTION OF THE DRAWINGS

FIG. 3 is a circuit diagram indicating a scanning circuit constituting the liquid crystal light valve according to the present invention in detail.

FIG. 13 is a diagram indicating the construction of a projection type display, to which the liquid crystal light valve according to the present invention is applied.

DETAILED DESCRIPTION

Figure 1:
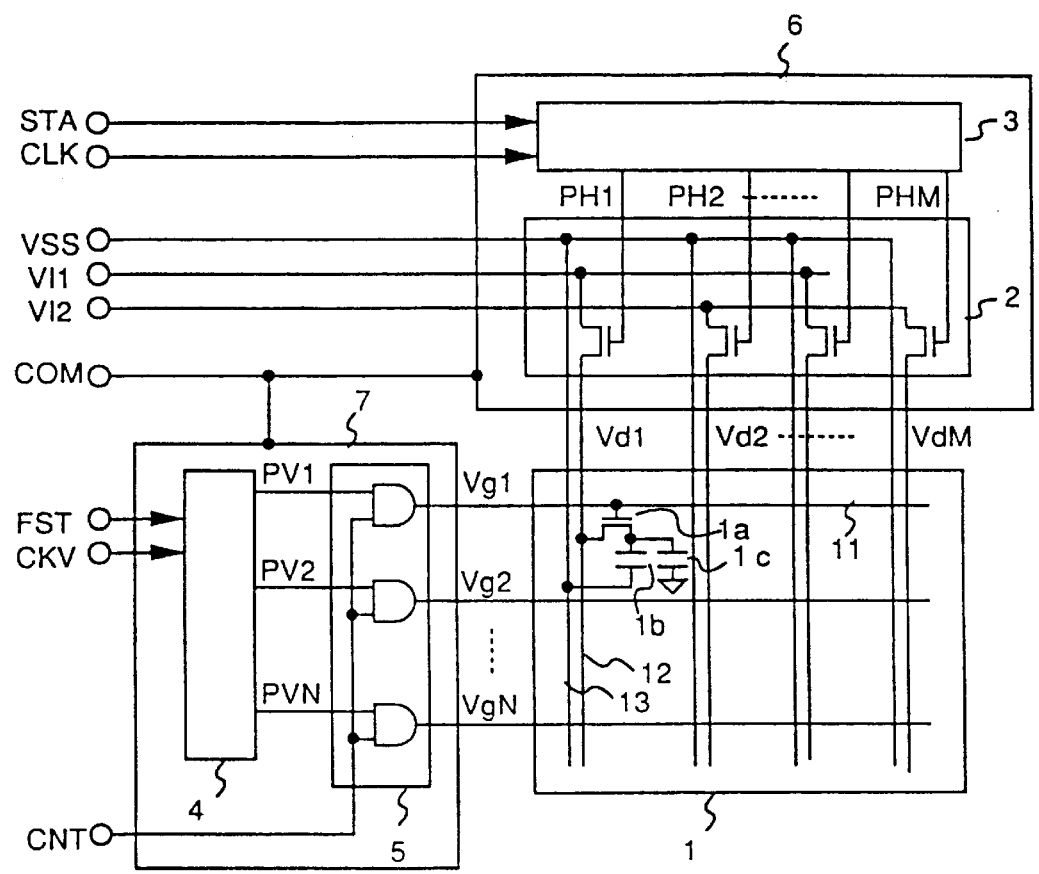
FIG. 1 is a diagram indicating the circuit construction of a liquid crystal light valve according to the present invention.

Hereinbelow several embodiments of the present invention will be explained in detail.

FIG. 13 shows the construction of a projection type display, to which a liquid crystal light valve according to the present invention is applied. The present projection type display is composed of a light source 400, a first lens 410, a mirror 420, a second lens 430, a liquid crystal light valve 440, a projection lens 450 and a screen 460. Light emitted by the light source 400 is focused at the position of the mirror 420 by the first lens 410. This light is transformed into a parallel light beam by the second lens 430, which light beam is projected to the liquid crystal light valve 440. Reflection state of the light projected to the liquid crystal light valve is controlled by varying voltage applied to different liquid crystal pixels and light reflected by the liquid crystal light valve is projected to the screen 460 in an enlarged scale through the second lens 430 and the projection lens 450 to form an image thereon.

Further it is also possible to obtain a projection type color display by decomposing light of the light beam coming from the light source into 3 light beams of 3 primary colors, disposing a liquid crystal light valve for each of the light beams of 3 primary colors, recombining lights reflected by 3 liquid crystal light valves, and projecting them to a screen in an enlarged scale. The decomposition of light into the 3 primary colors and the recombination of lights reflected by the 3 liquid crystal light valves can be effected simultaneously e.g. by means of a dichroic mirror. The structure of such a projection type color display is disclosed in the U.S. patent application Ser. No. 07/853,426. The content of the application is incorporated herein by reference.

FIG. 1 indicates the circuit construction of the liquid crystal light valve used for the projection type display described above. The light valve is composed of a pixel circuit 1, a sampling circuit 2, a horizontal scanning circuit 3, a vertical scanning circuit 4 and AND gates 5. In the pixel circuit 1 there are arranged MOS transistors 1a and holding capacitances 1b in M lines in the horizontal direction and N rows in the vertical direction. This arrangement number of pixels M×N is 640×480 as an example. Scanning signals Vg1 to VgN and brightness signals Vd1 to VdM are inputted to the gate electrodes and the drain electrodes of these MOS transistors through first signal lines (scanning signal lines) 11 and second signal lines (image signal lines) 12, respectively, and each of the source electrodes is connected with one end of a holding capacitor 1b and one end of a liquid crystal element 1c. The other end of the holding capacitor 1b is connected with a voltage source VSS supplying a substrate voltage through a third signal line (substrate feeding line) 13. The liquid crystal element 1c represents an equivalent capacitance of the liquid crystal element mounted between the pixel circuit 1 and the opposite substrate described previously.

Clock signals CLK and start signals STA are inputted to the horizontal scanning circuit 3 described above, which outputs multi-phased signals PH1 to PHM of M phases. The sampling circuit 2 is composed of MOS switches. The output signals PH1 to PHM and image signals VI1 or VI2 having an opposite polarity are inputted to the gate electrodes and the drain electrodes, respectively, of the MOS switches stated above and the MOS switches output the brightness signals Vd1 to VdM through the source electrodes.

Clock signals CKV and start signals FST are inputted to the vertical scanning circuit 4, which outputs multi-phased signals PV1 to PVN of N phases. The multi-phased signals PV1 to PVN and control signals CNT are inputted to the AND gates 5, which output the scanning signals Vg1 to VgN.

The horizontal scanning circuit 3 and the sampling circuit 2 are covered by a shading layer 6 and the vertical scanning circuit 4 and the AND gates 5 are covered by a shading layer 7. The shading layers 6 and 7 are connected with a voltage source COM for the opposite electrode.

Figure 2:
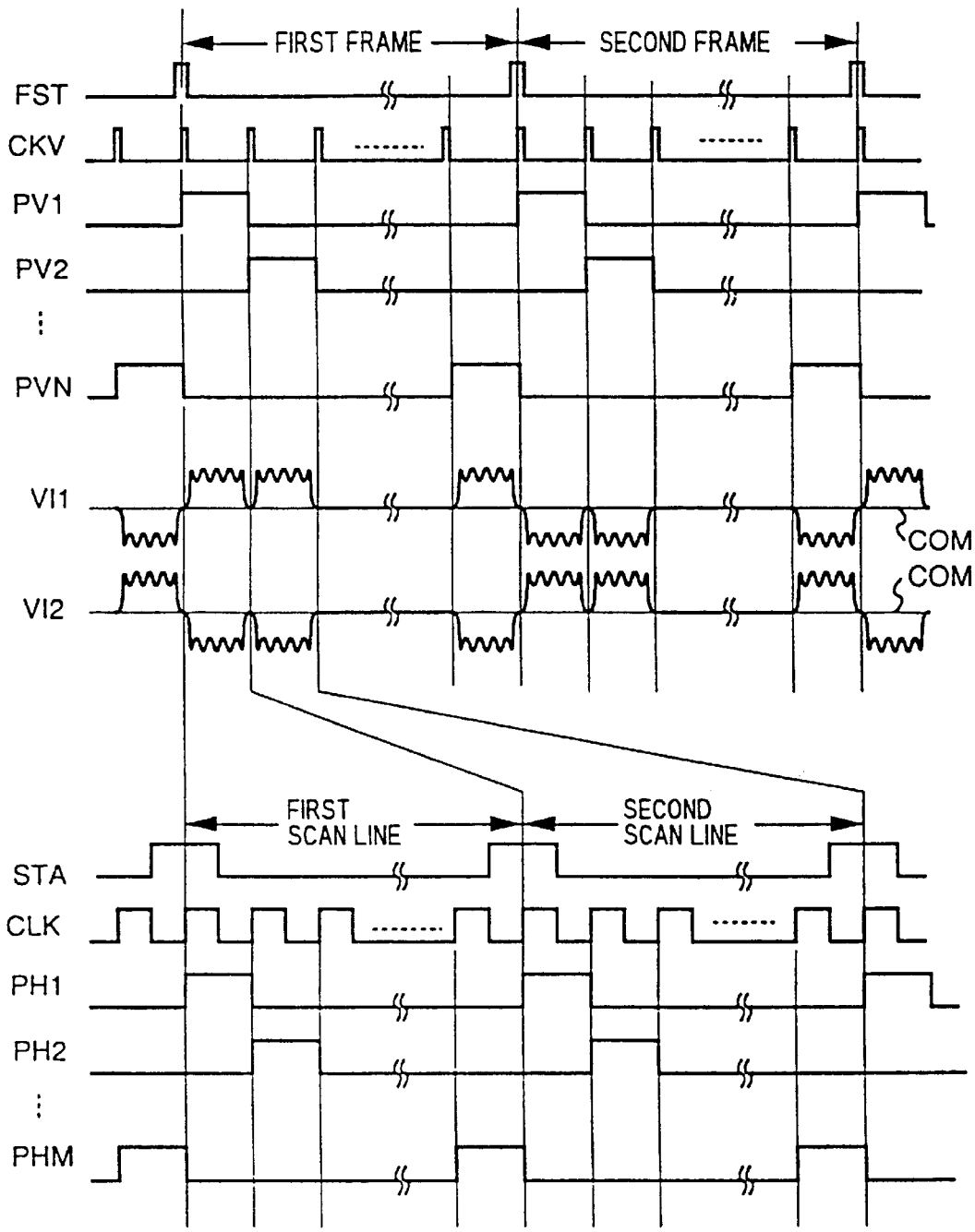
FIG. 2 is a timing chart indicating operation of the liquid crystal light valve according to the present invention.

The operation of the liquid crystal light valve constructed as described above will be explained, referring to the timing chart indicated in FIG. 2. The start signal FST for the vertical scanning circuit 4 represents the heading of the frame of an image to be displayed and the clock signal CKV indicates timing to switch the scanning line. The vertical scanning circuit 4 takes-in the start signal FST with timing of rising of the clock signal CKV and outputs the multi-phased signals PV1 to PVN described previously.

The multi-phased signals PV1 to PVN and the control signal CNT are inputted to the AND gates, which outputs the scanning signals Vg1 to VgN for the pixel circuit. Here at the successive scanning, by which the lines are scanned one by one, the scanning signals Vg1 to VgN are made equal to the multi-phased signals PV1 to PVN by making the control signal CNT "H" to select the pixel circuit 1 arranged in a matrix form as described above one after another in the vertical direction.

On the other hand, in the case of the 2-line simultaneous scanning, by which the lines are scanned two by two, a double clock consisting of two successive pulses is used for the clock signal CKV. The control signal CNT is made "L" only during the period of this double clock to interrupt the multi-phased signals described previously. This is because combination of the multi-phased signal is different from others only at a moment during the double clock period and at this time the voltage, at which information is written in the holding capacitance, varies, this variation being prevented by the control signal CNT.

The image signals VI1 and VI2 are signals varying with respect to the voltage COM applied to the opposite electrode, the polarities of which are opposite to each other and inverted for every frame.

The start signal STA for the horizontal scanning circuit 3 represents the heading of each scanning line. Similar to the vertical scanning circuit 4 described previously, the horizontal scanning circuit 3 takes-in the start signal STA with timing of rising of the clock signal CLK and outputs the multi-phased signals PH1 to PHM.

The sampling circuit 2 samples successively the image signals VI1 and VI2 with timing of the multi-phased signals PH1 to PHM to output the brightness signals Vd1 to VdM.

The brightness signals Vd1 to VdM are inputted to the pixel circuit 1 arranged in a matrix form for every row. At this time, since only the MOS transistors in the pixel circuit 1 selected by the scanning signals Vg1 to VgN are in the ON state, the brightness signals Vd1 to VdM are written in the holding capacitors 1b of the selected lines in the pixel circuit to be held there. Since the voltage held in the holding capacitors 1b is applied to the liquid crystal, the liquid crystal light valve in the present embodiment can display an image responding to the image signals VI1 and VI2.

In this case, charging current of the holding capacitor 1b flows from the image signal VI1 to the substrate feeding terminal VSS through an MOS switch in the sampling circuit, a second signal line 12, an MOS transistor 1a in the pixel circuit, the holding capacitor 1b and a third signal line 13. For shortening charging time at this time it is efficient to decrease series resistance and parasitic capacitance of wiring in the charging path described above. For this reason, according to the present invention, metal wiring layers are used for the second signal lines 12 and the third signal lines 13 and the lines are arranged parallelly to each other.

This charging speed will be explained below in detail. The voltage held by the holding capacitor 1b varies due to cross-talk noise between the scanning signal and the brightness signal, OFF-current of the MOS transistor, leak current due to resistance of the liquid crystal, etc. For this reason, flicker is produced in the displayed image, when holding time is long. Usually, in order to prevent this flicker, the period of the start signal FST is set at 1/60 sec. At this time, the sampling time Ts in the sampling circuit 2 is given approximately by the following formula:

$$Ts = 1/(M \times N \times 60) \tag{Eq. 1}$$

where M represents the number of pixels in the horizontal direction and N the number of pixels in the vertical direction. Using this formula, it can be understood that the sampling time is as short as about 50 ns for 300,000 pixels required for the projection type display, while it is about 400 ns for 40,000, which is a conventional number of pixels.

In a prior art liquid crystal display using MOS transistors, there were disposed specifically no third signal lines 13 but it was so constructed that the silicon substrate or diffusion layers were used for the current path. However sheet resistance of this part is as high as several hundred $\Omega$ even for a diffusion resistor and the resistance of the substrate feeding line is greater than several hundred k$\Omega$, if the pitch of the pixel circuit in the liquid crystal light valve for the projection type display is about 60 $\mu$m. For this reason, by the prior art substrate feeding line high speed writing was impossible.

On the contrary, according to the present invention, the resistance of the substrate feeding line is reduced to several hundred $\Omega$ by using a metal wiring layer for this substrate feeding line (third signal line) and further inductance of the wiring is decreased by arranging the substrate feeding line and the image signal lines (second signal lines) parallel to each other. High speed writing is realized by decreasing impedance of the wiring as described above.

Next the scanning circuit constituting the liquid crystal light valve and the operation thereof will be explained. FIG. 3 shows an embodiment of the horizontal and the vertical scanning circuit in the liquid crystal light valve according to the present invention. Each stage of these circuits is composed of a D type flipflop FF, an inverter INV and a level converting circuit LS. The horizontal scanning circuit consists of M stages and the vertical scanning circuit consists of N stages. In each of the circuits flipflops FF described above are connected in series to constitute a shift register.

The level converting circuit LS is composed of two PMOS transistors (MP1, MP2), whose sources are connected with VDD, and two NMOS transistors (MN1, MN2), whose sources are connected with VSS. The output of each of the flipflops FF is connected with the gate of one of the PMOS transistors MP1 and after having inverted the phase by means of the inverter INV also with the gate of the other of the PMOS transistors MP2. The gates of the NMOS transistors MN1 and MN2 are connected with each other and also with the drains of the transistors MN1 and MP1. Further the drains of the transistors are connected with each other, this point acting as the output PH (PV) of the scanning circuit. Owing to this construction, when the output of the flipflop FF stated above is "H" (VDD), the transistors MP1 and MN2 are in an OFF state, the transistor MP2 is in an ON state, and the output PH (PV) is at VDD. On the contrary, the output of the flipflop FF stated above is "L" (GND), the transistors MP1 and MN2 are in the ON state, the transistor MP2 is in the OFF state, and the output PH (PV) is at VSS. In this way the level converting circuit LS converts 0-VDD signals into VSS-VDD signals.

Here the level converting circuits LS are composed of high withstand voltage CMOS transistors driven by a power supply of VDD (+5 V)-VSS (-15 V), while the flipflops FF and the inverters INV are composed of low withstand voltage CMOS transistors driven by a power supply of VDD (+5 V)-0.

Figure 4:
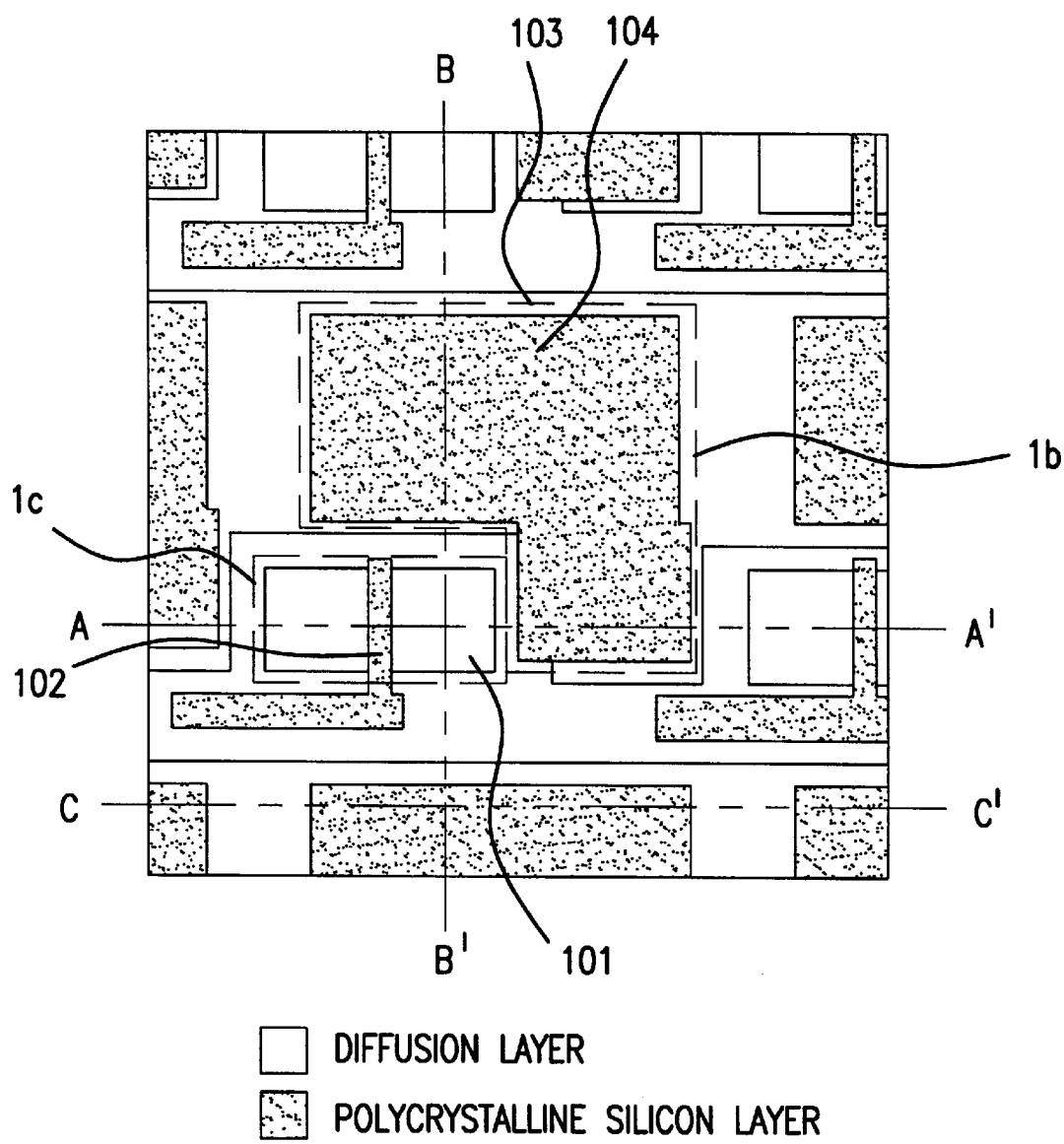
FIG. 4 shows an example of the layout of a polycrystalline silicon layer, on which a pixel circuit according to the present invention is formed.
Figure 5:
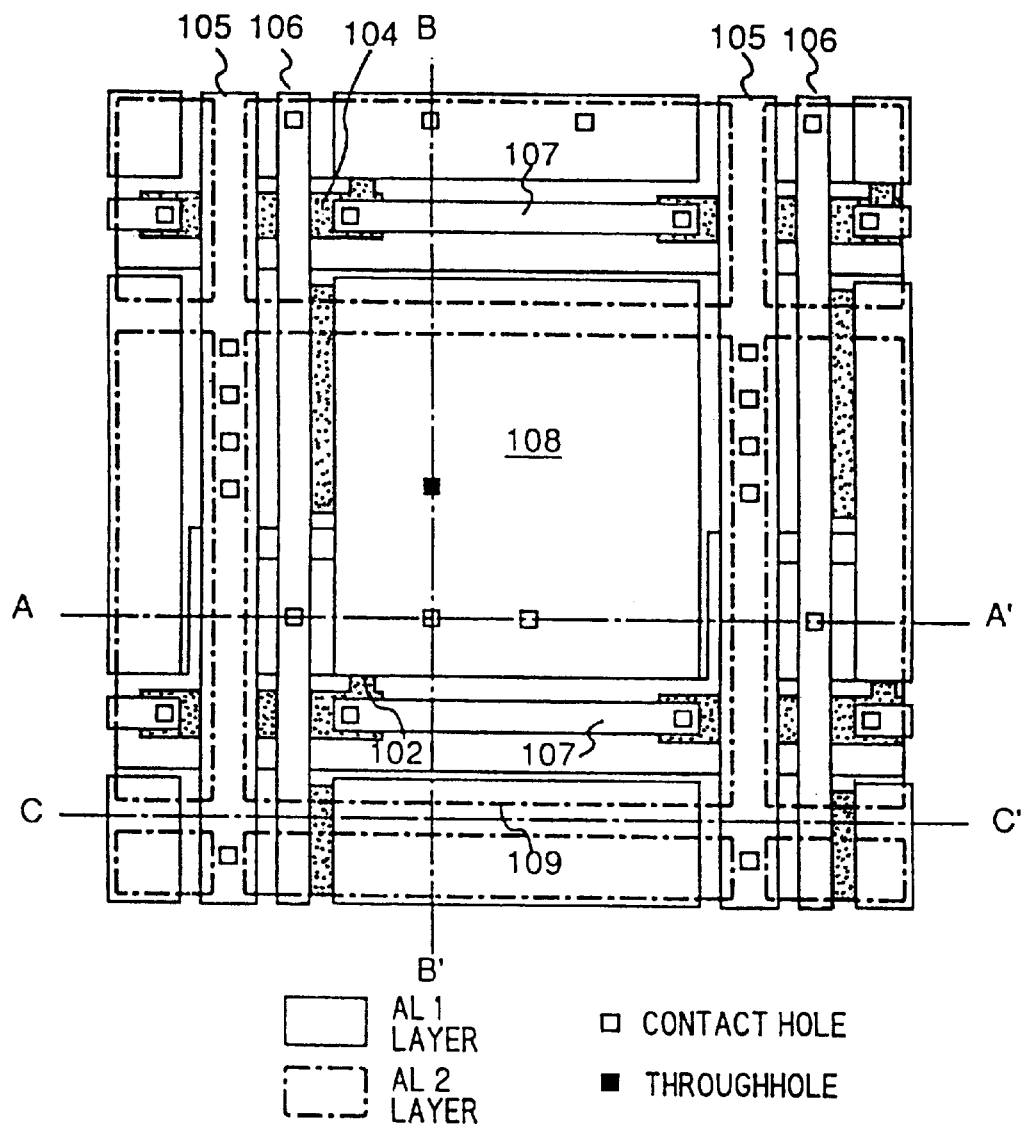
FIG. 5 shows an example of the layout of aluminium layers AL1 and AL2 in the pixel circuit according to the present invention.
Figure 6:
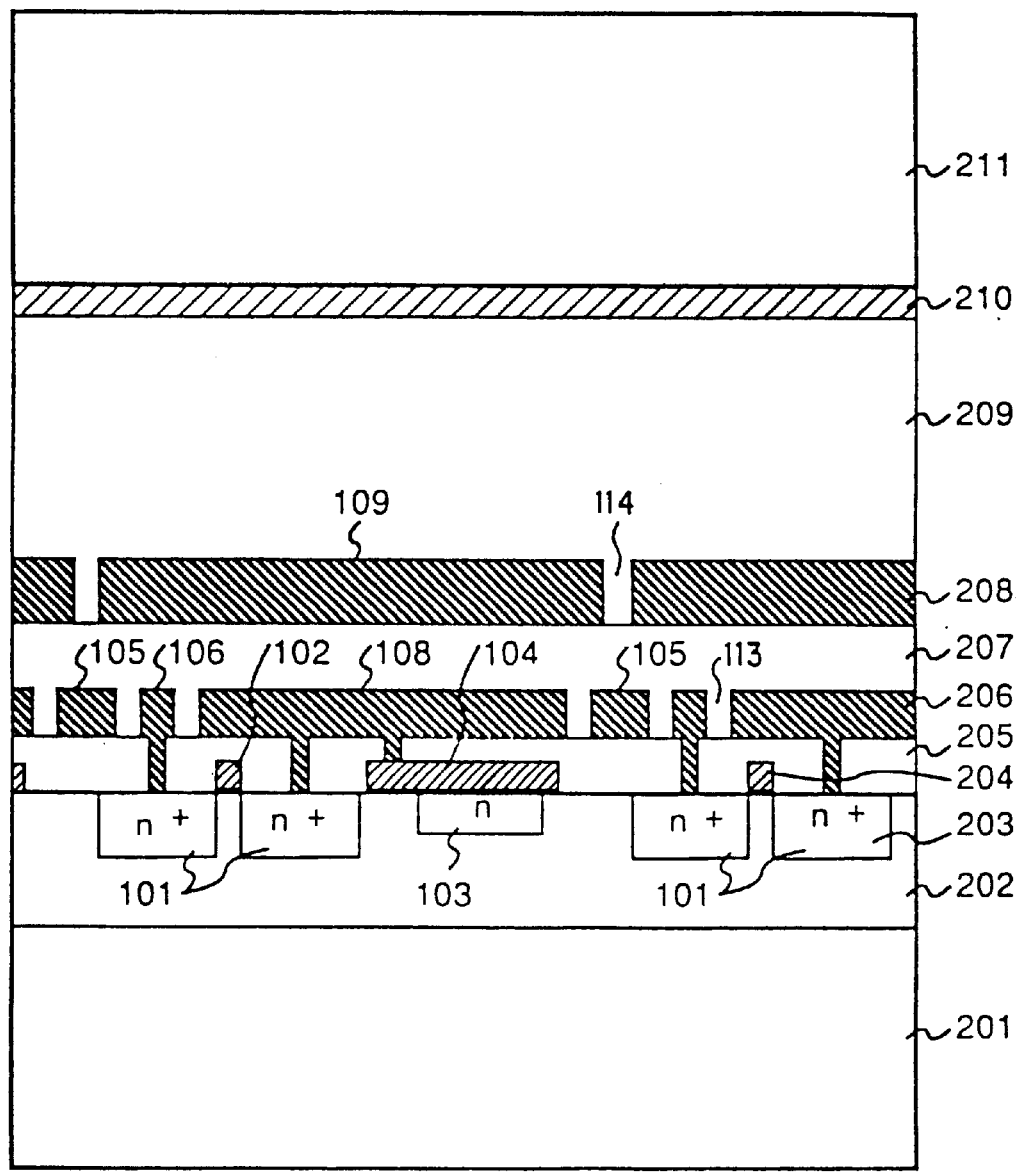
FIG. 6 is a cross-sectional view along a line A-A' of the pixel circuit indicated in FIGS. 4 and 5.
Figure 7:
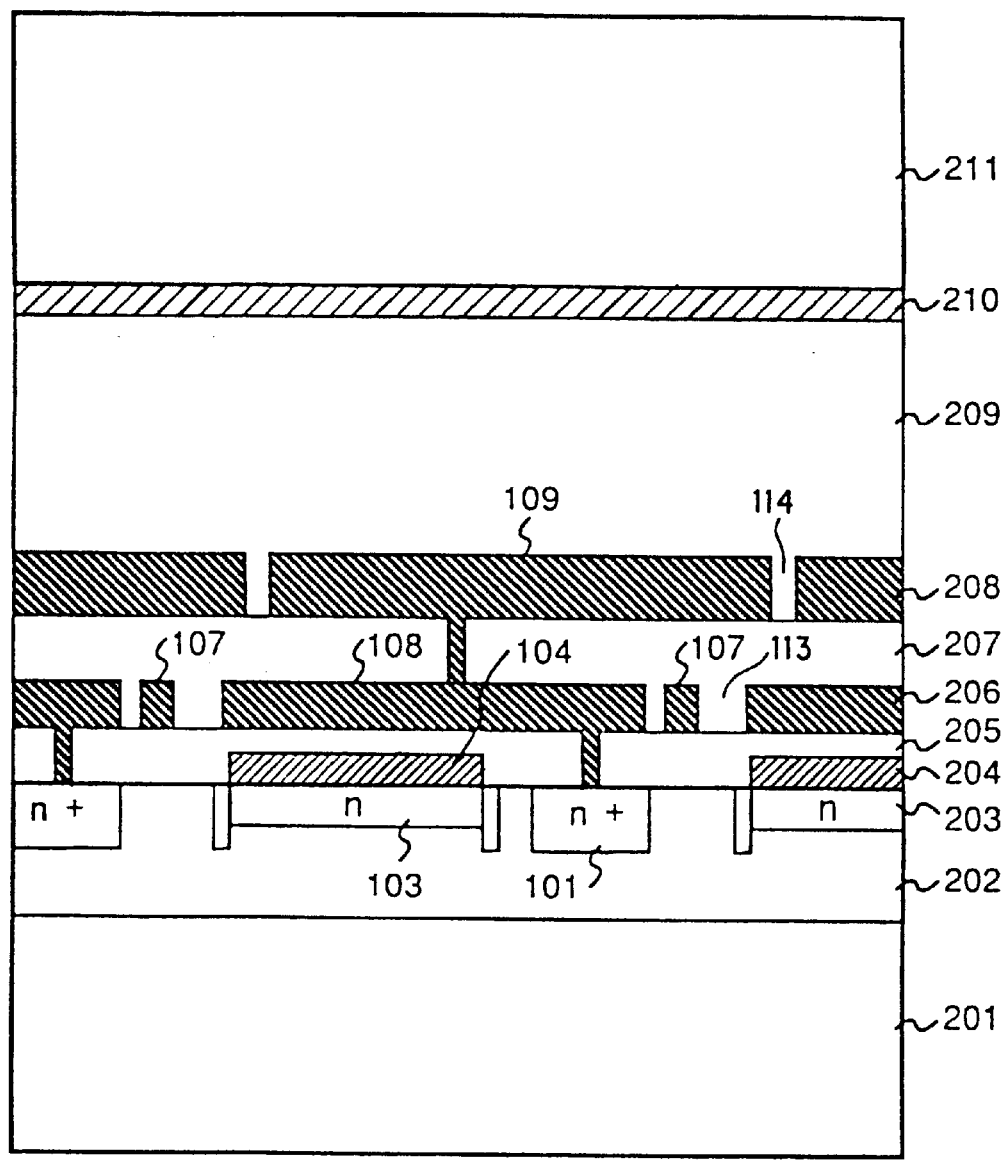
FIG. 7 is a cross-sectional view along a line B-B' of the pixel circuit indicated in FIGS. 4 and 5.
Figure 8:
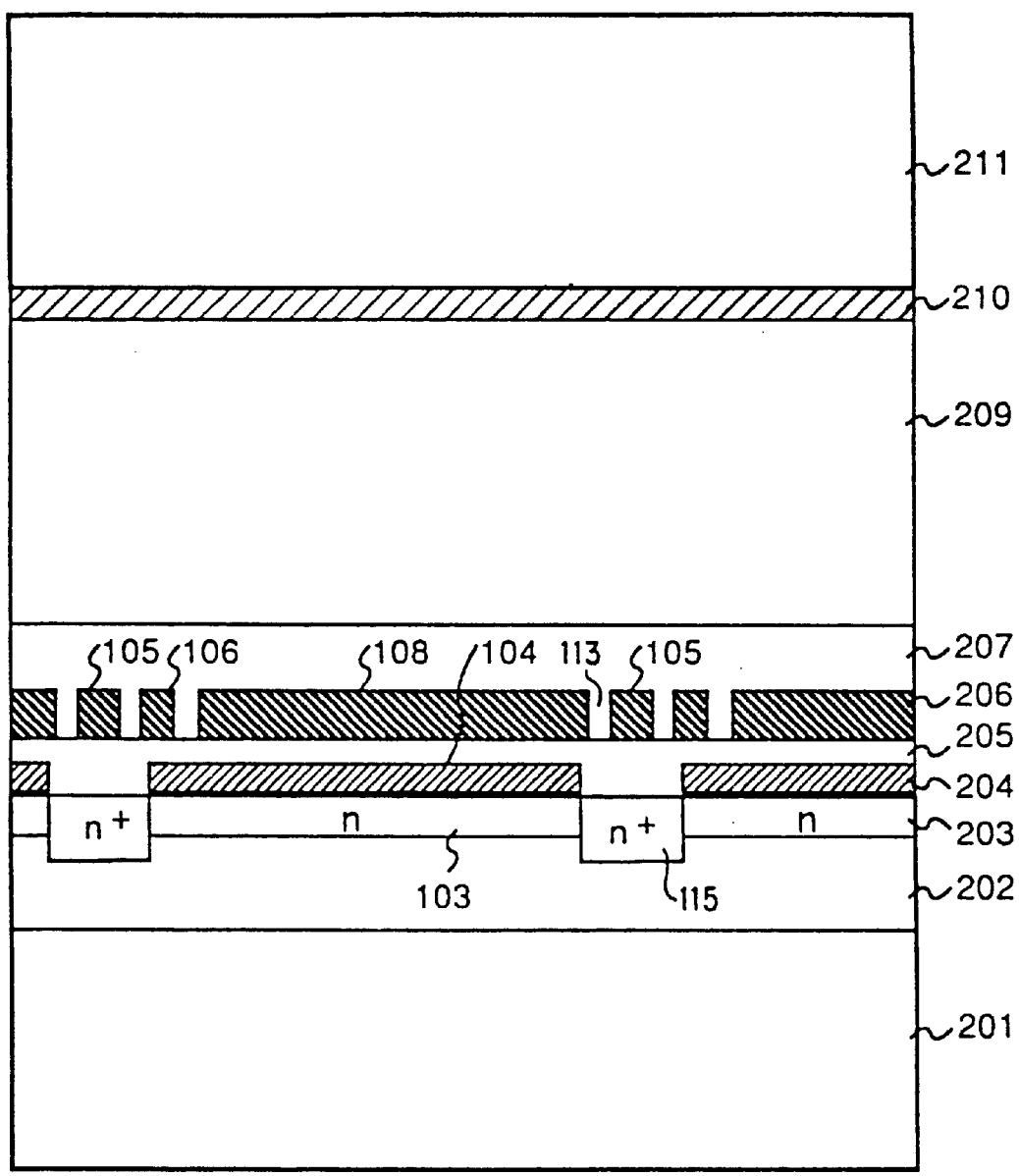
FIG. 8 is a cross-sectional view along a line C-C' of the pixel circuit indicated in FIGS. 4 and 5.

Next the layout construction and the cross-sectional construction of the pixel circuit in the liquid crystal light valve according to the present invention will be explained. FIGS. 4 and 5 show an example of the layout of the pixel circuit formed on a silicon substrate and FIGS. 6, 7 and 8 are cross-sectional views of the liquid crystal light valve along lines A-A', B-B' and C-C', respectively, in FIGS. 4 and 5. The liquid crystal light valve according to the present invention consists of an n conductivity type silicon substrate 201, on which the pixel circuit, the sampling circuit, the horizontal scanning circuit, the vertical scanning circuit, etc. are formed and an opposite substrate 211, on which a transparent electrode (opposite electrode) 210 are formed, the space between which is filled with liquid crystal 209. The structure of the liquid crystal light valve is also described in the above U.S. Patent Application.

In the present example of the layout, the liquid crystal light valve is fabricated by using a high withstand voltage process of 2 $\mu$m, in which the MOS transistors 1a serving as matrix switches are constructed by enhancement type NMOS transistors and the holding capacitances 1b are constructed by MOS capacitances. For wiring layers one polycrystalline layer and two AL (aluminium) layers are used. A pitch of 64 $\mu$m is used both in the horizontal and the vertical direction in the pixel circuit.

FIG. 4 shows a layout pattern of diffusion layers in the pixel circuit and the polycrystalline silicon layer formed thereon. The diffusion layers constitute the sources and the drains of the MOS transistors and the substrate side electrodes of the holding capacitors, while the polycrystalline silicon layers form the gates of the MOS transistors, the other electrodes of the holding capacitances, and a part of wiring.

In FIG. 4, a diffusion layer 101 and a polycrystalline silicon layer 102 constitute the MOS transistor 1a, while another diffusion layer 103 and another polycrystalline silicon layer 104 constitute the holding capacitance 1b. The size of the MOS transistor 1a is determined by the part, where the polycrystalline silicon layer 102 and the diffusion layer 101 are superposed. The part elongated in the horizontal direction in the figure of this polycrystalline silicon layer 102 is a part of the gate wiring. The gate oxide film formed between the diffusion layer 103 and the polycrystalline silicon layer 104 serves also as the insulating film for the holding capacitance 1b.

FIG. 5 shows a layout pattern of an aluminium layer AL1 formed on the silicon substrate, on which the diffusion layers and the polycrystalline silicon layers indicated in FIG. 4 are formed, through a first insulating layer 205, another aluminium layer AL2 formed further thereon through a second insulating layer 207, contact holes (CONT) and throughholes (TC). CONTs represent connection portions between the diffusion layers or the polycrystalline silicon layers and the aluminium layer AL1, while TCs represent connection portions between the aluminium layers AL1 and AL2.

Each of the aluminium layers AL1 and AL2 is divided by a plurality of slits (113 and 114 in FIGS. 6, 7 and 8) to form various wirings and electrodes. A third signal line 105 and a second signal line 106 constructed by the aluminium layer AL1 correspond to the third signal line 13 and the second signal line 12, respectively, in the circuit construction indicated in FIG. 1. Since they are arranged so as to be parallel to each other in the vertical direction, conductance of the wiring viewed from the input side can be reduced. The third signal line 105 is connected with the diffusion layer 103 in the substrate (p conductivity type well layer 202 in FIGS. 6, 7 and 8) and the holding capacitance through contact holes CONT, while the second signal line 106 is connected with the drain of the MOS transistor therethrough. As the result of this layout, current path when the holding capacitance 1b is charged is formed by the signal line 106, the MOS transistor 1a, the holding capacitance 1b and the third signal line 105. Since impedance at the charging is reduced by the fact that the second and the third signal line 105 and 106 are constructed by using metal wiring layers so as to be parallel to each other as described above, writing speed in voltage in the holding capacitance can be increased.

As indicated in FIG. 7, the diffusion layer 101 constituting the source electrode of the MOS transistor 1a is connected with a second pixel electrode 109 through a first pixel electrode 108 through a contact hole CONT and a throughhole TC. The aluminium layer AL1 is used for the first pixel electrode 108, while the aluminium layer AL2 is used for the second pixel electrode 109. The layout of the first and the second pixel electrode is so designed that intervals between different patterns of each of them are as small as possible and the area of each of the pixel electrodes is as large as possible in order to reduce light, with which the liquid crystal light valve is irradiated by the light source as indicated in FIG. 13 and which arrives at the MOS transistor, and unevenness on the surface of the second pixel. It is so designed that the area of the slits 113, 114 between the different pixel electrodes is as small as possible and that shading effect of the pixel electrodes is as great as possible. Further, owing to the fact that the width of the slits 113 formed in the aluminium layer AL1 is small, unevenness of the surface of the insulating layer formed thereon by application, etc. is reduced and unevenness of the surface of the aluminium layer AL2 formed further thereon is also reduced. Light, with which the liquid crystal light valve is irradiated by the light source, is not randomly reflected by the second pixel electrodes but utilized with a high efficiency to be projected on the screen owing to the fact that unevenness of the pixel electrodes acting as reflecting electrodes is reduced so that it is possible to form a bright image. The aluminium layer portion 107 of the first signal line constitutes a part of the first signal line 11 indicated in FIG. 1. The parts extending in the horizontal direction of the aluminium layer portion 107 and the polycrystalline silicon layer 102 of the MOS transistor are connected with each other through a contact hole CONT to form the first signal line (scanning signal line) 11 extending in the horizontal direction as a whole.

In the cross-sectional view indicated in FIG. 6, reference numeral 202 is the p conductivity type well layer; 203 is the diffusion layer; 204 is the polycrystalline silicon layer; 205 is the first insulating layer; 206 is the aluminium layer AL1; 207 is the second insulating layer; and 208 is the aluminium layer AL2, all of which are formed on the n conductivity type silicon substrate 201. The diffusion layers 101 of the MOS transistor form the drain and the source, while the polycrystalline silicon layer 102 forms the gate. Further the diffusion layers 103 of the MOS capacitance form the electrodes (drain and source) on the substrate side, while the polycrystalline silicon layer 104 forms the electrode (gate) on the pixel side. The source electrode 101 of the MOS transistor is connected with the polycrystalline silicon layer 104 of the MOS capacitance through the first pixel electrode 108.

The liquid crystal light valve according to the present invention is of reflection type, by which high intensity light projected from the opposite substrate 211 side is reflected by the second electrode 109 and the intensity of this reflected light is controlled by the state of the liquid crystal 209. For example, when a polymer dispersion type liquid crystal is used for the liquid crystal 209, it is changed from a scattering state to a transparent state by the voltage of the second pixel electrode 109. For this reason, reflectivity of each pixel is high, when the liquid crystal 209 is in the transparent state, and low, when it is in the scattering state. In the present light valve images are displayed by controlling this state of the liquid crystal by varying the voltage applied to the second pixel electrode 109. The light valve using the polymer dispersion type liquid crystal is written in the above U.S. Patent Application.

Next shading against irradiation light will be explained. When a semiconductor pn junction portion is irradiated with light, photo-current is produced. It is in the source electrode portion in the diffusion layer 101 of the MOS transistor. When the photo-current flows through this source electrode portion, the voltage written in the holding capacitor is lowered, which worsens significantly the image quality. For this reason light to the diffusion layer of the MOS transistor is shaded by the aluminium layers AL1 and AL2. In particular, light passing through slits 114 between electrodes of the second pixel electrode 109 is shaded by the fact that wiring width of the third signal line 105 is sufficiently larger than the space between electrodes stated above and located directly below the space between electrodes.

FIG. 7 shows the cross-sectional structure along the line B-B' in an example of the layout of the pixel circuit according to the present invention, which indicates the source electrode portion of the MOS transistor viewed in the vertical direction. Light, which has passed through the slits between electrodes of the second pixel electrode 109, is further shaded by the fact that the first pixel electrode 108 corresponding to the second pixel electrode 109 is located so as to protrude below the slits between electrodes described previously.

FIG. 8 shows the cross-sectional structure along the line C-C' in the example of the layout of the pixel circuit according to the present invention, which indicates the slit portions 114 between electrodes of the second pixel electrode 109. This region includes parts of the surface of the silicon substrate irradiated directly with light, which is not shaded even by the aluminium layers AL1 and AL2 but passes through slit portions 113 in the aluminium layer AL1 and slit portions 114 in the aluminium layer AL2. This direct light passes through the slits 113 in the different patterns of the first pixel electrode 108, the third signal line 105 and the second signal line 106 and is projected to n$^+$ diffusion layer 115 neighboring to the diffusion layer 103 of the MOS capacitance. n$^+$ diffusion layer 115 is formed to obtain, an ohmic contact between the third signal line and the diffusion layer 103 of the MOS capacitance. This light is converted into photo-current in the pn-junction portion between the n$^+$ conductivity type diffusion layer 115 and the p conductivity type well layer 202. Since both the well layer 202 and the diffusion layer 103 of the MOS capacitance are connected with the third signal line (substrate feeding line) 105 and fed with the lowest voltage (VSS) as described previously, the photo-current generated in the pn junction portion flows through the p conductivity type well layer and the third signal line to be consumed. As the result, since the photo-current doesn't flow to the diffusion layer 101 of the MOS transistor and particularly to the source electrode, the voltage written in the holding capacitance can be held stably and even if it is irradiated with intense light as in a projection type display, image quality is not worsened.

Further the photo-current can be reduced also by using a light absorbing insulating layer for at least one of the first insulating layer 205 and the second insulating layer 207. Colored polyimide, etc. can be used for this light absorbing insulating layer. Still further the photo-current can be reduced also by disposing layers made of black material on the front or rear surface of the first aluminium layer AL1 206 acting as the first wiring layer or the rear surface of the second aluminium layer AL2 208 acting as the second wiring layer and patterning them in a same shape as the different wiring layers. Chromium oxide, tantalum oxide, etc. may be used for this black material.

Now another embodiment of the liquid crystal light valve according to the present invention will be explained, referring to FIGS. 9 and 10. Differences thereof from the embodiment indicated in FIGS. 4 to 8 consist in that the aluminium wiring layer is of 3-layered structure and that a separate shading layer is disposed between the first pixel electrode and the second pixel electrode. However the layout of the diffusion layer and the polycrystalline silicon layer is identical to that used in the preceding embodiment.

Figure 9:
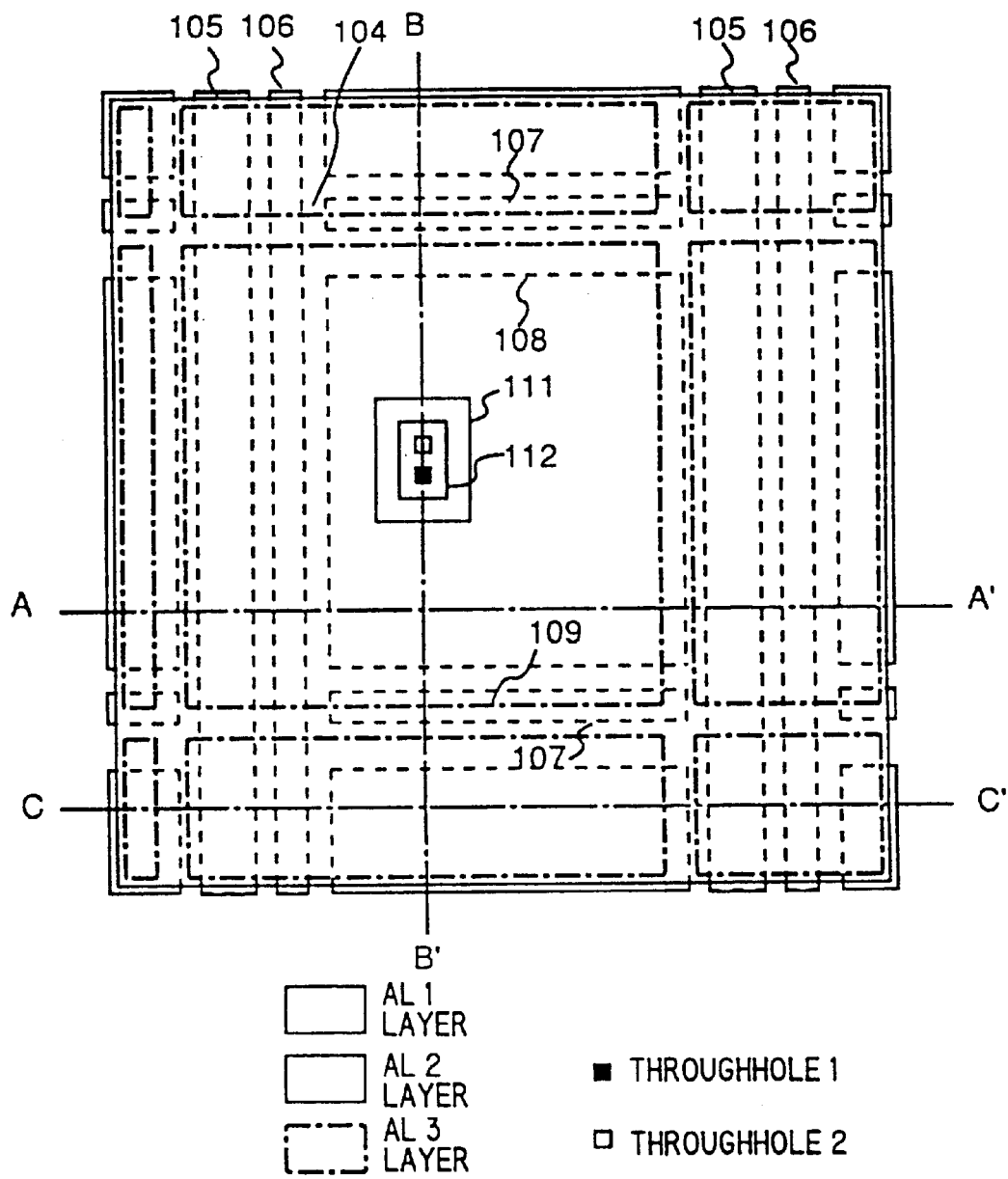
FIG. 9 shows an example of the layout of aluminium layers AL1 to AL3 in the pixel circuit in another embodiment of the present invention.
Figure 10:
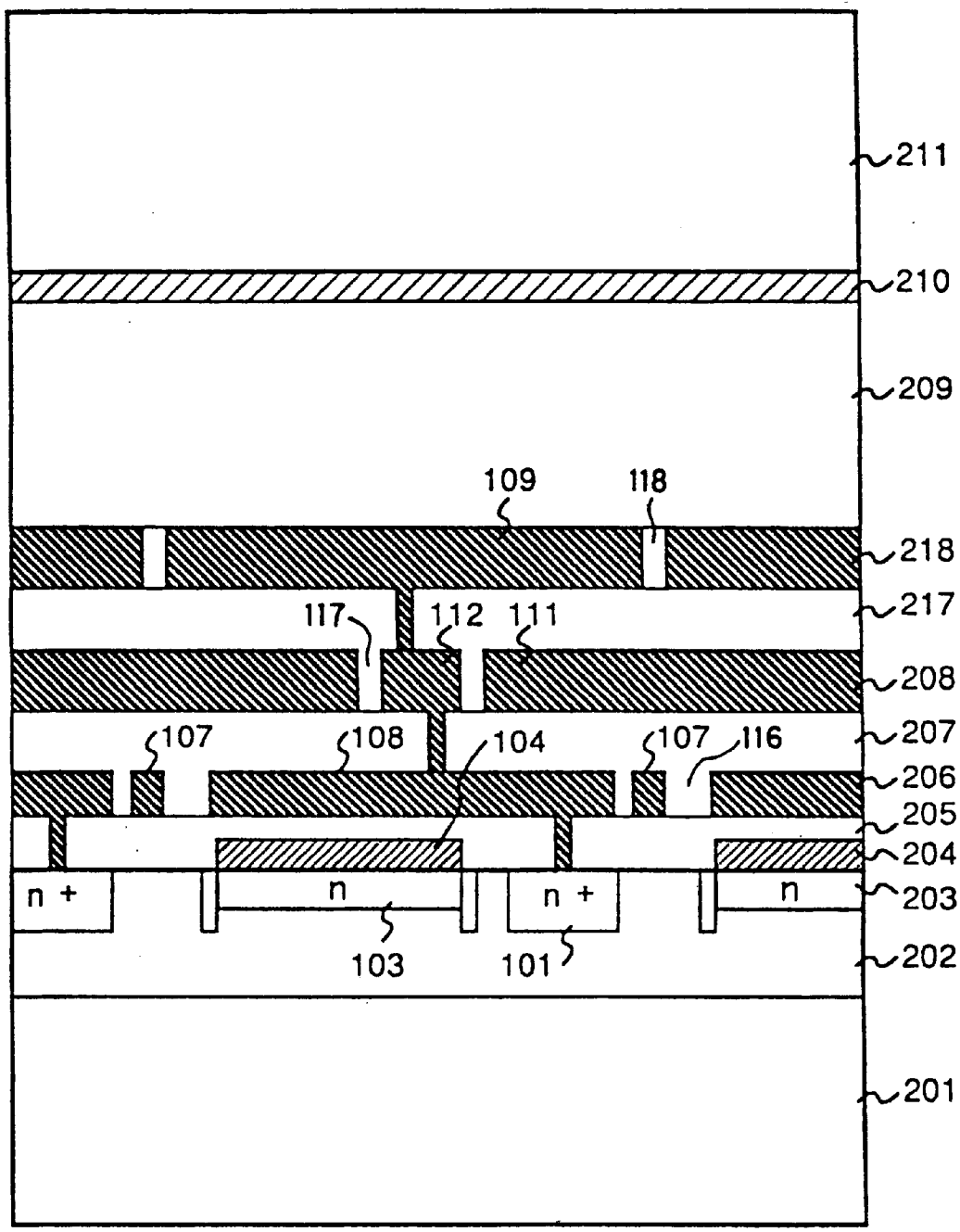
FIG. 10 is a cross-sectional view along a line B-B' of the pixel circuit indicated in FIG. 9.

FIG. 9 shows an example of the layout of the aluminium layers AL1 to AL3 of the pixel circuit in the other embodiment of the present invention and FIG. 10 is a cross-sectional view thereof along a line B-B' in FIG. 9. In the present embodiment a shading layer 11 is disposed between the first pixel electrode 108 and the second pixel electrode 109 and a third electrode 112 is constructed by the aluminium layer AL2 208. Due to the fact that this layer is added, the second electrode 109, which was constituted by the aluminium layer AL2 in the first embodiment, is changed to be constituted by the aluminium layer AL3. The aluminium layer AL1 206 and the aluminium layer AL2 208 are connected through a throughhole 1 (TC1), while the aluminium layer AL2 208 and the aluminium layer AL3 218 are connected through a throughhole 2 (TC2). The throughhole 1 is formed in an insulating layer 207, while the throughhole 2 is formed in an insulating layer 217.

As clearly seen from the construction indicated in this figure, light projected through the slits 118 between electrodes of the second pixel electrode constituted by the aluminium layer AL3 218, which is the uppermost layer, is interrupted completely by the shading layer 111 constituted by the aluminium layer AL2 208. That is, since the slit portions 118 formed in the aluminium layer AL3 218 and the slit portions 117 formed in the aluminium layer AL2 208 are located so as not to be overlapped but to be deviated from each other, when viewed from the opposite substrate side, the light projected from the opposite substrate side is reflected by either one of the aluminium layers AL3 or AL2 and thus doesn't arrive at the silicon portion.

As described above, in the present embodiment, the light projected from the opposite substrate side is interrupted by the aluminium layers AL2 and AL3, which are the upper 2 layers. In order to prevent for the projected light to arrive at the silicon substrate, the slit portions 116, 117 and 118 formed in the aluminium layers AL1, AL2 and AL3 may be located so as to be deviated from each other not to be overlapped.

Further, in the construction indicated in FIGS. 9 and 10, the photo-current can be reduced also by using a light absorbing insulating layer for at least one of the first insulating layer 205, the second insulating layer 207 and the third insulating layer 217. Colored polyimide, etc. can be used for this light absorbing insulating layer. Still further the photo-current can be reduced also by disposing layers made of black material on the front or rear surface of at least one of the first aluminium layer AL1 206, the second aluminium layer AL2 208 and the third aluminium layer AL3 218 and patterning them in a same shape as the different wiring layers. Chromium oxide, tantalum oxide, etc. may be used for this black material.

Figure 11:
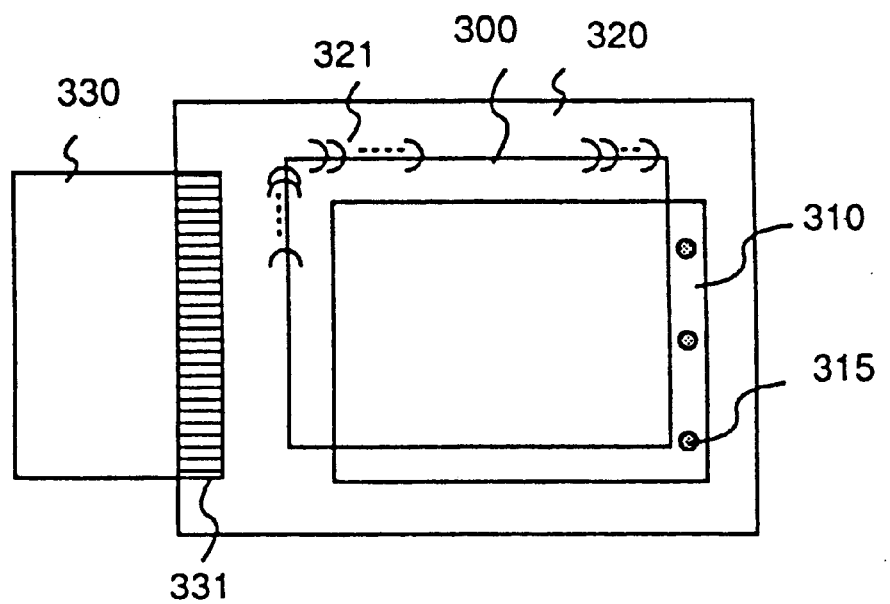
FIG. 11 is a plan view indicating the construction of the liquid crystal light valve according to the present invention.
Figure 12:
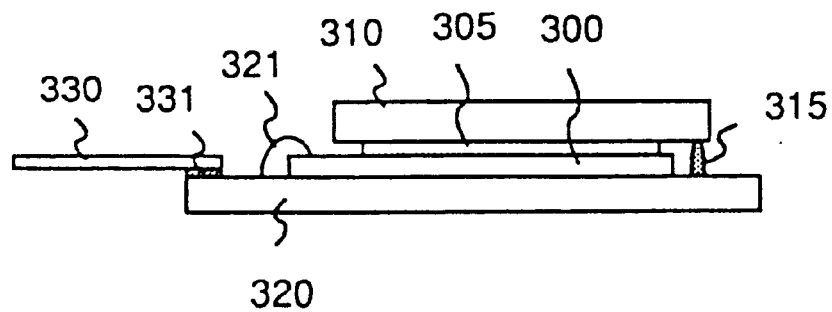
FIG. 12 is a cross-sectional view indicating the construction of the liquid crystal light valve according to the present invention.

Now mounting of the liquid crystal light valve according to this invention will be explained below. FIGS. 11 and 12 show the construction in a plan view and the cross-sectional construction, respectively, of an example of the liquid crystal light valve according to the present invention. The liquid crystal light valve according to the present invention is composed of a integrated circuit chip 300, a ceramic substrate 320, an opposite electrode 310, and a flexible print board 330. The integrated circuit chip 300 is adhered to the ceramic substrate 320 with conductive paste and a liquid crystal 305 is mounted between the surface thereof and the opposite electrode 310. Signal terminals of the integrated circuit chip 300 are connected with wiring patterns on the ceramic substrate through wire bonding. Further conductive paste is used for connection of the transparent electrode on the opposite substrate 310 with the wiring patterns on the ceramic substrate. Wire bonding positions on the integrated circuit chip are located on the upper side and the left side of the chip, while contact positions with the opposite electrode are located on the right side. Distance between the opposite substrate and the wire bonding portions can be decreased owing to the fact that wire bonding portions are located on more than 2 sides.

The flexible print board 330 is connected with the wiring patterns on the ceramic substrate 310 through solder 331 to supply control signals to the liquid crystal light valve.

Although liquid crystal light valves using a monocrystal silicon substrates as well as projection type displays using same have been explained in the above, it is a matter of course that the present invention can be realized also by using a substrate, in which a semiconductor layer is formed on an insulating substrate, or a compound semiconductor substrate instead of a monocrystal silicon substrate.

According to the present invention, since, in a liquid crystal light valve using a semiconductor substrate such as a silicon substrate, on which active elements such as MOS transistors are formed, and a projection type display using same, light projected to a semiconductor surface in a pixel circuit portion is shaded by a plurality of shading layers such as signal lines, pixel electrodes, etc. constituted by metal wiring layers and further the signal lines, pixel electrodes, etc. constituted by the metal wiring layers are so arranged that light, which is not shaded by them, is projected to diffusion layers in the semiconductor substrate connected with a reference potential, photo-current flowing through the active elements in the pixel circuit portion can be remarkably reduced. Furthermore, since metal wirings are used for the signal lines feeding different pixels with image signals and substrate feeding lines and they are arranged so as to be parallel to each other, impedance of the signal lines can be reduced and writing of signals in the pixels can be effected with a high speed. As the result thereof, it is possible to realize a liquid crystal light valve, which can be applied to a very fine projection type display having a high brightness, and a projection type display using same.

What is claimed is:

1. A liquid crystal light valve comprising:
    a semiconductor substrate having a region for a plurality of switching elements formed in a matrix form on a surface thereof;
    a first metal layer formed on said surface of said semiconductor substrate through an insulating layer and divided into a plurality of parts by first slits;
    a second metal layer formed on said first metal layer through another insulating layer and divided into a plurality of parts by second slits;
    an opposite substrate having an opposite electrode on a surface thereof, disposed so as to be opposite to said second metal layer through an interval on said opposite electrode side;
    liquid crystal filling said interval between said opposite electrode and said second metal layer; and
    an n conductivity type region and a p conductivity type region adjacent thereto disposed at a place where light projected from said opposite substrate side through said first slits and said second slits arrives at said semiconductor substrate, both said n conductivity type region and said p conductivity type region being connected with a reference potential.

2. A liquid crystal light valve according to claim 1, where a capacitive element region is disposed, corresponding to each of said switching element regions, on said surface of said semiconductor substrate and substrate feeding lines feeding substrate potential regions and capacitive element regions in said switching element regions with a substrate potential are constructed by either one of said metal layers.

3. A liquid crystal light valve according to claim 2, where image signal lines feeding image signal input terminal portions in said switching element regions with image signals are constructed by either one of said metal layers and said substrate feeding lines and said image signal lines are disposed in parallel to each other.

4. A liquid crystal light valve according to claim 2, where MOS transistors are formed in said switching element regions and MOS capacitances are formed in said capacitive element regions.

5. A liquid crystal light valve according to claim 1, where a signal circuit region is disposed on the surface of said semiconductor substrate, which region feeds said plurality of switching element regions with signals.

6. A liquid crystal light valve according to claim 5, where said signal circuit includes a circuit feeding said plurality of switching element regions with image signals a circuit feeding said switching elements with control signals.

7. A liquid crystal light valve according to claim 5, where said signal circuit has high withstand voltage CMOS transistors and low withstand voltage CMOS transistors.

8. A liquid crystal light valve according to claim 5, where there are disposed substrate feeding regions connected with a substrate potential on the surface of said semiconductor substrate in a peripheral portion of said signal circuit region.

9. A projection type display comprising:
    a liquid crystal light valve including a semiconductor substrate having a region for a plurality of switching elements formed in a matrix form on a surface thereof;
    a first metal layer formed on said surface of said semiconductor substrate through an insulating layer and divided into a plurality of parts by first slits;
    a second metal layer formed on said first metal layer through another insulating layer and divided into a plurality of parts by second slits;
    an opposite substrate having an opposite electrode on a surface thereof, disposed so as to be opposite to said second metal layer through an interval on said opposite electrode side; and
    liquid crystal filling said interval between said opposite electrode and said second metal layer;
    n conductivity type regions and p conductivity type regions adjacent thereto disposed at places where light projected from said opposite substrate side through said first slits and said second slits arrives at said semiconductor substrate, both said n conductivity type regions and said p conductivity type regions being connected with a reference potential;

a light source supplying light projected from said opposite electrode side to said liquid crystal light valve; and an optical system projecting light reflected by said liquid crystal light valve in an enlarged scale.

10. A liquid crystal light valve comprising:

a semiconductor substrate having a region for a plurality of switching elements formed in a matrix form on a surface thereof;

a first metal layer formed on said surface of said semiconductor substrate through an insulating layer and divided into a plurality of parts by first slits;

a second metal layer formed on said first metal layer through another insulating layer and divided into a plurality of parts by second slits;

an opposite substrate having an opposite electrode on a surface thereof, disposed so as to be opposite to said second metal layer through an interval on said opposite electrode side;

liquid crystal filling said interval between said opposite electrode and said second metal layer; and a black layer is disposed on at least one of surfaces of each of said first metal layer and said second metal layer, wherein semiconductor regions connected with a reference potential are disposed at places where light injected from said the opposite substrate side through said first slits and said second slits reaches said semiconductor substrate.

11. A liquid crystal light valve according to claim 10, where an n conductivity type region and a p conductivity type region adjacent thereto are disposed at a place where light projected from said opposite substrate side through said first slits and said second slits arrives at said semiconductor substrate, both said n conductivity type region and said p conductivity type region being connected with said reference potential.

12. A projection type display comprising:

a liquid crystal light valve including a semiconductor substrate having a region for a plurality of switching elements formed in a matrix form on a surface thereof;

a first metal layer formed on said surface of said semiconductor substrate through an insulating layer and divided into a plurality of parts by first slits;

a second metal layer formed on said first metal layer through another insulating layer and divided into a plurality of parts by second slits;

a capacitive element region disposed, corresponding to each of said switching element regions, on said surface of said semiconductor substrate and substrate feeding lines feeding substrate potential regions and capacitive element regions in said switching element regions with a substrate potential are constructed by either one of said metal layers;

an opposite substrate having an opposite electrode on a surface thereof, disposed so as to be opposite to said second metal layer through an interval on said opposite electrode side;

liquid crystal filling said interval between said opposite electrode and said second metal layer;

n conductivity type regions and p conductivity type regions adjacent thereto disposed at places where light projected from said opposite substrate side through said first slits and said second slits arrives at said semiconductor substrate, both said n conductivity type regions and said p conductivity type regions being connected with a reference potential;

a light source supplying light projected from said opposite electrode side to said liquid crystal light valve; and an optical system projecting light reflected by said liquid crystal light valve in an enlarged scale.

13. A projection type display comprising:

a liquid crystal light valve including a semiconductor substrate having a region for a plurality of switching elements formed in a matrix form on a surface thereof;

a first metal layer formed on said surface of said semiconductor substrate through an insulating layer and divided into a plurality of parts by first slits;

a second metal layer formed on said first metal layer through another insulating layer and divided into a plurality of parts by second slits;

a signal circuit region is disposed on the surface of said semiconductor substrate, which region feeds said plurality of switching element regions with signals;

an opposite substrate having an opposite electrode on a surface thereof, disposed so as to be opposite to said second metal layer through an interval on said opposite electrode side;

liquid crystal filling said interval between said opposite electrode and said second metal layer;

n conductivity type regions and p conductivity type regions adjacent thereto disposed at places where light projected from said opposite substrate side through said first slits and said second slits arrives at said semiconductor substrate, both said n conductivity type regions and said p conductivity type regions being connected with a reference potential;

a light source supplying light projected from said opposite electrode side to said liquid crystal light valve; and an optical system projecting light reflected by said liquid crystal light valve in an enlarged scale.

* * * * *

UNITED STATES PATENT AND TRADEMARK OFFICE
CERTIFICATE OF CORRECTION

PATENT NO. : 6,034,749
DATED : 07 March 2000
INVENTOR(S) : Hideo SATO et al.

It is certified that error appears in the above-identified patent and that said Letters Patent is hereby corrected as shown below:

| Column | Line | |
|---|---|---|
| 1 | 58 | Change "1x" to --lx--. |
| 1 | 60 | Change "pixels more than 30,000" to --more than 30,000 pixels--. |
| 1 | 63 | Before "formed" insert "is". |
| 2 | 5 | After "irradiation" insert --by--. |
| 2 | 59 | Change "one f" to --one of--. |
| 3 | 2 | Change "invluences" to --influence--. |
| 3 | 8 | Change "parallelly" to --parallel--. |
| 5 | 60 | Change "parallelly" to --parallel--. |
| 7 | 11 | Change "are formed" to --is formed--. |

UNITED STATES PATENT AND TRADEMARK OFFICE
CERTIFICATE OF CORRECTION

PATENT NO. : 6,034,749
DATED : 7 March 2000
INVENTOR(S) : Hideo SATO et al.

It is certified that error appears in the above-identified patent and that said Letters Patent is hereby corrected as shown below:

| Column | Line | |
|--------|------|---|
| 10 | 50 | After "prevent" delete "for"; change "to arrive" to --from arriving--. |
| 11 | 27 | Change "substates" to --substrate--. |

Signed and Sealed this

Twenty-fourth Day of April, 2001

Attest:

NICHOLAS P. GODICI

Attesting Officer     Acting Director of the United States Patent and Trademark Office